March 26, 1968 G. W. WORLEY 3,374,517
BICYCLE SADDLE CUSHION CONSTRUCTION METHOD
Filed Dec. 27, 1965 2 Sheets-Sheet 1
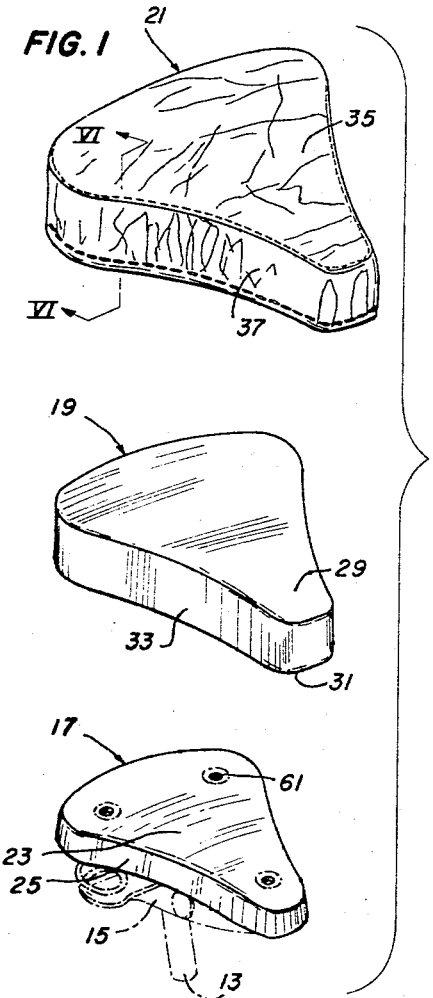
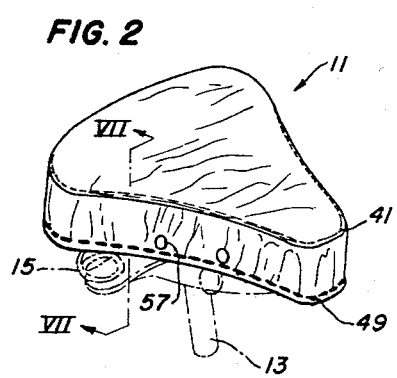
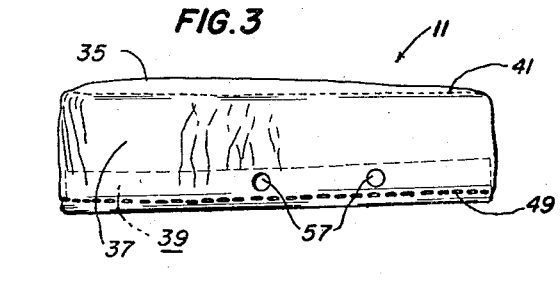
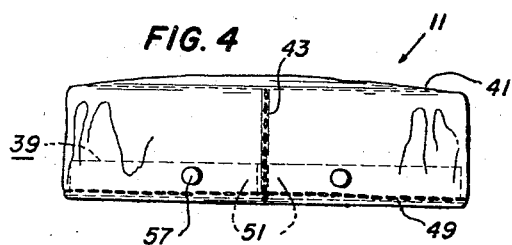
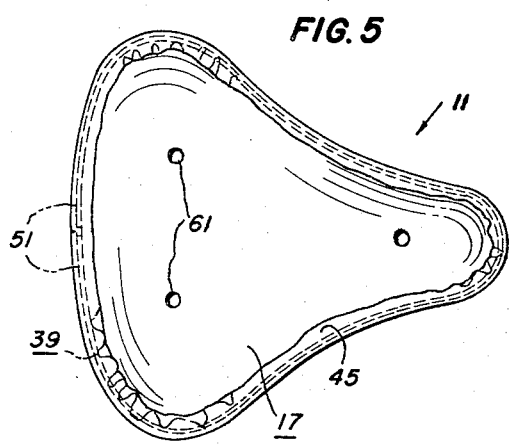
INVENTOR.
GEORGE W. WORLEY
BY John R. Walker, III
Attorney March 26, 1968  G. W. WORLEY  3,374,517
BICYCLE SADDLE CUSHION CONSTRUCTION METHOD
Filed Dec. 27, 1965  2 Sheets-Sheet 2
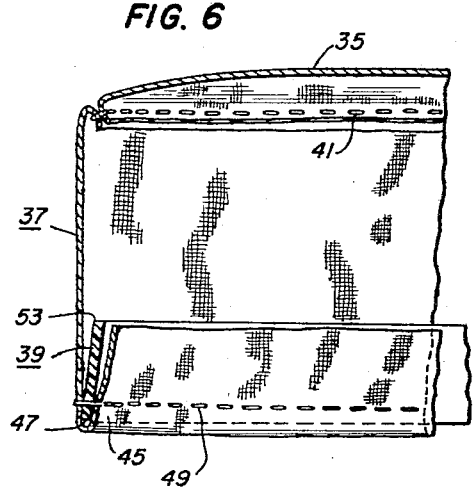
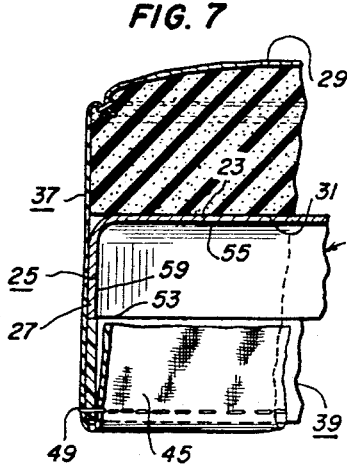
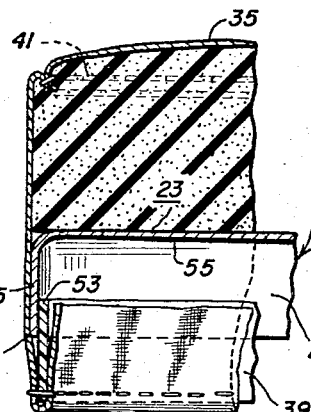
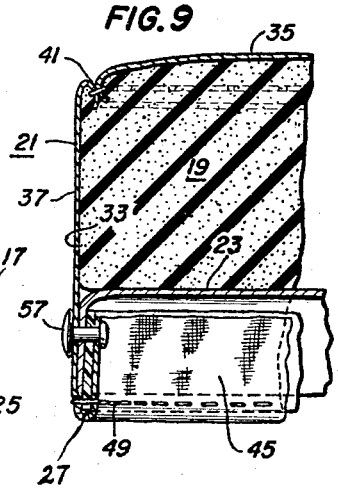
INVENTOR.
GEORGE W. WORLEY
BY John L. Walker, III
Attorney

United States Patent Office 3,374,517
Patented Mar. 26, 1968

3,374,517
BICYCLE SADDLE CUSHION CONSTRUCTION METHOD
George W. Worley, Bolivar, Tenn., assignor to Troxel Manufacturing Company, a corporation of Tennessee
Filed Dec. 27, 1965, Ser. No. 516,333
6 Claims. (Cl. 29—91.1)

This invention relates to bicycle saddles and particularly to the cushion component or the superstructure of a saddle.

An object of the present invention is to provide a method of making a bicycle saddle cushion component characterized by a minimum number of steps in the method.

A further object is to provide a method of constructing a bicycle saddle cushion component wherein each step of the method is a substantiallly simple step that may be performed quickly and easily.

A further object is to provide a method of constructing a bicycle saddle cushion component which does not require an extensive outlay in tools and machinery in carrying out the method.

A further object is to provide a bicycle saddle cushion construction method which utilizes only three basic parts and such parts as may readily be formed or fabricated.

A further object is to provide a method of constructing a strong and sturdy cushion.

A further object is to provide a bicycle saddle cushion construction method especially applicable in fabricating bicycle saddle cushions having thick soft cushion padding.

The means by which the foregoing and other objects of the present invention are accomplished and the manner by which they are accomplished will be readily understood upon reference to the accompanying drawings in which:

FIG. 1 is an exploded view of the bicycle saddle cushion and showing also (in broken lines) the supporting spring and frame assembly and the saddle post.

FIG. 2 illustrates the cushion part in an assembled configuration.

FIG. 3 is a side view of the assembled cushion component.

FIG. 4 is a rear view of the cushion.

FIG. 5 is a bottom view of the cushion.

FIG. 6 is a fragmentary sectional view taken as on the line VI—VI of FIG. 1.

FIGS. 7, 8 and 9 are fragmentary sectional views taken respectively as on the line VII—VII of FIG. 2 and illustrating various stages in the saddle cushion construction.

In the following detailed description of the invention, only the bicycle saddle superstructure, namely, only cushion component 11 will be described in detail. The cushion supporting or substructure parts of the saddle do not constiute a part of the invention; the post, indicated 13, or the saddle spring and frame parts, indicated 15, are illustrated for purposes of clarity only and parts 13 and 15 may be of typical or of any preferred form. Also, in the following description, the saddle cushion structure will be considered as being in a usual or typical environmental disposition and as shown in the drawings. The method also will be described with reference to the cushion or cushion parts as being positioned as illustrated in the drawings.

Cushion component 11 includes three basic parts, namely, a base member 17, a pad member 19, and a cover member 21.

Base member 17 is preferably press-formed from a single sheet metal piece of material and includes a substantially planar horizontal main portion 23 and a circumferentially extending flanged portion 25. The flanged portion projects substantially right angularly downwardly from main portion 23 and terminates in a circumferentially extending distal edge portion 27. The horizontal configuration or marginal contour of base member 17 is somewhat triangular shaped or of typical bicycle seat configuration.

Pad member 19 is preferably cut from a sheet of foam rubber or like material. The pad member is preferably of uniform thickness and is bounded respectively by upper and lower surfaces 29, 31 and a circumferentially extending edge surface 33. The horizontal proportions or marginal configuration of pad member 19 corresponds substantially to the horizontal proportions of base member flanged portion 25.

Cover member 21 includes a main portion 35 and a skirt portion 37 formed of supported vinyl or like material and also includes a retainer band 39 preferably formed of semi-rigid leather or press board material. A seam of thread 41 extends around the circumferential contour of cover member 21 and secures the depending skirt portion 37 to horizontally disposed main portion 35. A vertically extending seam of thread 43 abuttingly secures the end portions of skirt portion 37. It will be understood that other joining means may be used, such as heat sealing, in place of the seams of thread 41 and 43, without departing from the spirit and scope of the present invention. Retainer band 39 is confrontingly arranged relative to and extends circumferentially contiguous the inward side of cover member skirt portion 37. The circumferentially extending distal portion 45 of cover member skirt portion 37 is folded inwardly and upwardly around the lower edge portion 47 of retainer band 39 and a seam of thread 49 secures the parts together. End portions 51 of band 39 are substantially abuttingly arranged and are disposed respectively adjacent opposite sides of seam of thread 43 of cover member skirt portion 37. The circumferentially extending upper edge portion 53 of band 39 is unattached and freely displaceable away from skirt portion 37 of the cover member (see FIG. 6). Although cover member 21 is illustrated and has been described as being fabricated from supported vinyl portions 35, 37 and retainer band 39, it may be desirable in certain applications to mold or press the cover member of one piece integral construction. In such a construction, the retainer band would then be an integral part of the skirt and main portions of the cover.

In assembling cushion component 11 the following steps are carried out: The base, pad and cover members are positioned in stacked arrangement with upper surface 29 of the pad member engaging main portion 35 of the cover member and with the pad member lower surface 31 engaging main portion 23 of the base member. Cover member 21 is fitted over the pad and base members with skirt portion 37 of the cover member closely surounding pad member edge surface 33, and with the lower edge of skirt portion 37 and retainer band 39 surrounding base member flanged portion 25. In other words, both the skirt portion 37 and retainer band 39 are on the outside of flanged portion 25.

The partially assembled cushion component is then placed between suitable press means having upper and lower jaws or platen members (not shown). The partially assembled cushion component is placed between the jaws of the press means with the upper jaw thereof engaging the upper surface of main portion 35 of the cover member, and with the lower jaw of the press means engaging the undersurface 55 of base member 17. The press means is actuated thereby exerting a compressive force on and moving base member main portion 23 and cover member main portion 35 towards one another. Pad member 19 is compressed and the cover member skirt portion and retainer band are moved downwardly along the outside surface of base member flanged portion 25. The press means is actuated and the movement of the base and cover members is continued until the upper edge portion 53 of band 39 is substantially even or contiguous distal edge portion 27 of base member 17 (see FIG. 7). It will be understood that the pressing herein described may be done usually or by any other suitable means without departing from the spirit and scope of the present invention. For example, the parts may be turned over from the position herein described and the partially assembled cushion component placed with the cover member 21 fitted in a stationary mold or cavity, and then the base member 17 moved downwordly to compress the pad member 19. At any rate, the pressing is done by suitable means and while holding the respective parts as shown in FIG. 7, upper edge portion 53 of band 39 is worked inwardly and underneath the distal edge portion 27 of base member 17 (see FIG. 8). A hand operable tool having a hook-shaped end portion may be used in accomplishing this step. The hooked end of the tool may be engaged with the upper edge portion 53 of retainer band 39 and the band pulled inwardly and downwardly, thereby effecting this step and disposing flanged portion 25' of the base member between the upper edge portion of the band and the skirt portion of the cover member.

With the respective parts arranged as illustrated in FIG. 8, the press means is released, and the press jaws moved apart. Releasing the compressive force on the base and cover member main portions allows the resiliency of pad member 19 to divergingly move the base and cover member main portions and thereby cause the distal edge portion 27 of base member 17 to substantially seat against the circumferentially extending seam of thread 49 (see FIG. 9). The relative proportions of the various parts of cushion component 11 is such that when base member distal edge portion 27 is seated against seam of thread 49 or when the respective parts are arranged, as illustrated in FIG. 9, the pad member will not be in a completely expanded state but will exert considerable tension on cover member skirt portion 37.

A plurality of rivets 57 preferably extend through and firmly secure retainer band 39 and cover member skirt portion 37 to flanged portion 25 of the base member. Also, the distal portion 45 of cover member skirt portion 37 is preferably secured by rivets 57. In certain applications it may not be desirable to attach the cover member skirt portion to the base member flanged portion with rivets or the like. In such applications it may be desirable to provide inwardly projecting fastening members projecting from the inside surface 59 of base member flanged portion 25. In such a construction the retainer band only would be secured to the flanged portion of the base member. Suitable means for attaching the base member to the spring and frame parts 15 of the saddle may comprise fastener means 61. Such fastening means is somewhat typical in the bicycle saddle art and does not constitute a part of this invention. Moreover, it is apparent that the particular means utilized in attaching cushion component 11 to a bicycle saddle spring and frame assembly will be determined by the particular saddle frame design and construction.

Although this invention has been described with reference to a preferred method of construction, it is to be understood that it is not to be so limited since certain changes may be made therein which are within the full intended scope of the invention as hereinafter claimed.

I claim:

1. A method of constructing a bicycle saddle cushion component utilizing a base member including a substantially planar horizontal main portion and a substantially thin flanged portion depending from and circumferentially extending about said main portion and with said flanged portion having a circumferentially extending downwardly directed distal edge portion; a pad member of resilient material having oppositely facing generally planar upper and lower surfaces and a circumferentially extending edge surface; and a cover member including a substantially planar horizontal main portion, a skirt portion depending from and extending circumferentially about said main portion and including a circumferentially extending distal portion and a retainer band confrontingly arranged relative to and extending circumferentially contiguous the inward side surface of said skirt portion and with the lower edge of said skirt portion and the lower edge portion of said retaining band being securely conjoined in a circumferentially extending seam and with the upper edge portion of said band being unattached and substantially freely displaceable away from said skirt portion of said cover member; the method comprising:

(a) positioning in stacked order said base, pad and cover members with the upper surface of said pad member engaging the main portion of said cover member and with the lower surface of said pad member engaging the main portion of said base member with said skirt portion substantially closely surrounding said pad member edge surface and with said skirt portion and said retaining band of said cover member substantially closely surrounding respectively said pad member edge surface and said base member flanged portion;

(b) exerting a compressive force on and moving relatively together said base member main portion and said cover member main portion thereby compressing said pad member and causing said cover member skirt portion and conjoined retaining band to move downwardly along the outward side of said base member flanged portion;

(c) continuing the movement respectively of said base and cover member main portions until the upper edge portion of said retaining band is substantially contiguous the lower edge portion of said base flanged portion;

(d) holding said pad member compressed and with the relative arrangement of parts arranged as recited in the immediately preceding step, and while holding thusly (e) working the upper edge portion of said band inwardly along the circumferential extension of said band and inwardly underneath and past the distal edge portion of said base member flanged portion and thereby disposing the base member flanged portion substantially between the upper edge portion of said band and the depending skirt portion of said cover member, and then (f) releasing the compressive force on said base member and cover member main portions and on said pad member, thereby allowing the resiliency of said pad member to move said base and cover member main portions apart and cause the distal edge portion of said base member flanged portion to substantially seat against the circumferentially extending conjoined seam portions of said retaining band and said skirt portion of said cover member.

2. The method of constructing a bicycle saddle cushion component as recited in claim 1 which additionally includes a final step of:

(g) firmly securing said retaining band of said cover member to said base member flanged portion.

3. The method of constructing a bicycle saddle cushion component as recited in claim 1 which additionally includes a final step of:

(g) firmly securing said retaining band and said skirt portion of said cover member to said flanged portion of said base member.

4. A method of constructing a bicycle saddle cushion component utilizing a base member including a substantially planar horizontal main portion and a substantially thin flanged portion depending from and circumferentially extending about said main portion and with said flanged portion having a circumferentially extending downwardly directed distal edge portion; a pad member of resilient material having oppositely facing generally planar upper and lower surfaces and a circumferentially extending edge surface, a cover member including a substantially planar horizontal main portion, a skirt portion depending from and extending circumferentially about said main portion and including a circumferentially extending distal portion, and a retainer band; the method comprising:

(a) securely joining said retaining band to said skirt portion adjacent the lower edges thereof with said band being confrontingly arranged relative to and extending circumferentially contiguous the inward side surface of said skirt portion and with the upper edge portion of said band being unattached and substantially freely displaceable away from said skirt portion of said cover member;

(b) positioning in stacked order said base, pad and cover members with the upper surface of said pad member engaging the main portion of said cover member and with the lower surface of said pad member engaging the main portion of said base member, with said skirt portion substantially closely surrounding said pad member edge surface and with said skirt portion and said retaining band of said cover member substantially closely surrounding said base member flanged portion;

(c) exerting a compressive force on and moving relatively together said base member main portion and said cover member main portion thereby compressing said pad member and causing said cover member skirt portion and conjoined retaining band to move downwardly along the outward side of said base member flanged portion;

(d) continuing the converging movement respectively of said band and cover member main portion until the upper edge portion of said retaining band is substantially even or contiguous the lower edge portion of said base flanged portion;

(e) holding said pad member compressed and with the relative arrangement of parts arranged as recited in the immediately preceding step, and while holding thusly;

(f) working the upper edge portion of said band inwardly along the circumferential extension of said band and inwardly underneath and past the lower edge portion of said base member flanged portion and thereby disposing the base member flanged portion substantially between the upper edge portion of said band and the depending skirt portion of said cover member (g) releasing the comparative force on said base member and cover member main portions and on said pad member and thereby allowing the resiliency of said pad member to divergingly move said base and cover member main portions and thereby cause the lower edge portion of said base member flanged portion to substantially seat against the circumferentially extending conjoined seam portions of said retaining band and said skirt portion of said cover member.

5. The method of constructing a bicycle saddle cushion component as recited in claim 4 which additionally includes a final step of:

(h) firmly securing said retaining band to said base member flanged portion.

6. The method of constructing a bicycle saddle cushion component as recited in claim 4 which additionally includes a final step of:

(h) firmly securing said retaining band and said skirt portion of said cover member to said flanged portion of said base member.

References Cited

UNITED STATES PATENTS

| 1,590,135 | 6/1926 | Upham | 29—91.1 |
| 1,864,477 | 6/1932 | Stannard | 29—91.1 |
| 1,940,636 | 12/1933 | Stubnitz | 29—91.1 |

THOMAS H. EAGER, *Primary Examiner.*